United States Patent
Le Creff et al.

(10) Patent No.: US 6,839,215 B2
(45) Date of Patent: Jan. 4, 2005

(54) PROTECTION DEVICE FOR A TERMINAL THAT CAN BE CONNECTED TO A LOCAL AREA NETWORK CAPABLE OF PROVIDING A REMOTE POWER FEED TO TERMINALS

(75) Inventors: Michel Le Creff, Vigny (FR); Raymond Gass, Bolsenheim (FR)

(73) Assignee: Alcatel, Paris (FR)

( * ) Notice: Subject to any disclaimer, the term of this patent is extended or adjusted under 35 U.S.C. 154(b) by 183 days.

(21) Appl. No.: 10/189,409

(22) Filed: Jul. 8, 2002

(65) Prior Publication Data

US 2003/0043527 A1 Mar. 6, 2003

(30) Foreign Application Priority Data

Jul. 9, 2001 (FR) .............................................. 01 09088

(51) Int. Cl.[7] .............................................. H02H 3/22
(52) U.S. Cl. ..................................................... 361/119
(58) Field of Search ................................ 361/119, 117, 361/118

(56) References Cited

U.S. PATENT DOCUMENTS 5,721,773 A * 2/1998 Debalko ..................... 379/412
5,790,363 A   8/1998 Chaudhry

FOREIGN PATENT DOCUMENTS

WO   WO 99/53627 A1   10/1999
WO   WO 00/41496 A3   7/2000

* cited by examiner

*Primary Examiner*—Hung V. Ngo
(74) *Attorney, Agent, or Firm*—Sughrue Mion, PLLC

(57) ABSTRACT

A protection device protects a terminal that can be connected to a jack connected to a local area network capable of providing a remote power feed to terminals. The protection device includes:

capacitors (C1, ..., C4; C1', ..., C4') for preventing the propagation of a direct current from said jack to the terminal, and (R1, ..., R4, ZD, LED; R1', ..., R4', ZD', LED') for signaling to a user the presence of a remote power feed voltage at the jack concerned. Application to computer networks.

5 Claims, 1 Drawing Sheet

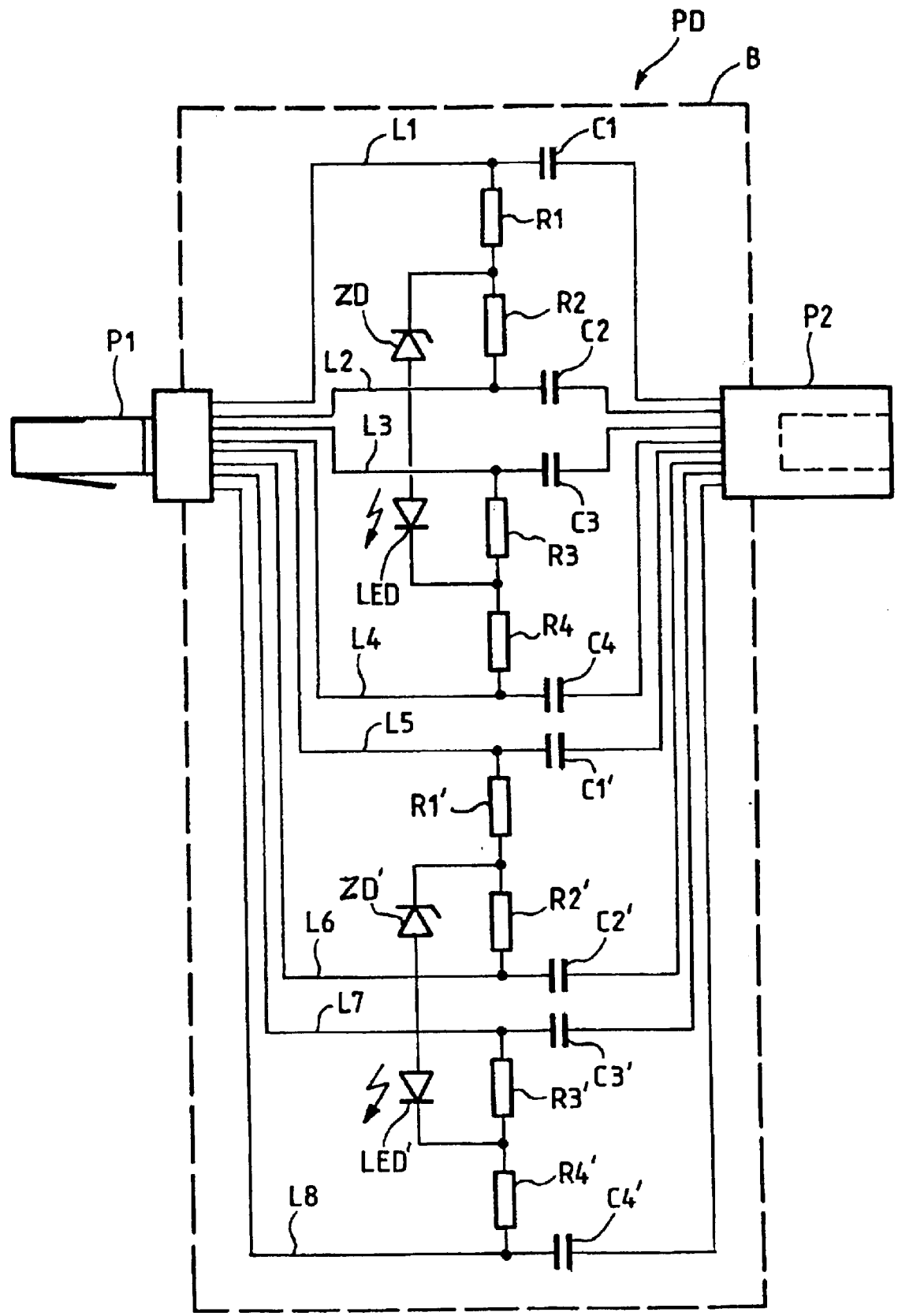

PROTECTION DEVICE FOR A TERMINAL THAT CAN BE CONNECTED TO A LOCAL AREA NETWORK CAPABLE OF PROVIDING A REMOTE POWER FEED TO TERMINALS

BACKGROUND OF THE INVENTION

The present invention relates to a protection device which can be used to protect a terminal which can be connected to a local area network which can provide a remote power feed to terminals. The network can be an Ethernet network, for example.

In the conventional way, terminals connected to a computer local area network (for example: personal computers, printers, etc) are supplied with power locally, from the mains. However, it is desirable for some terminals connected to a computer local area network to receive a remote power feed via the connection used to send and receive data. This applies to telephones connected to a computer network, for example.

In an Ethernet network, for example, a connection comprises eight wires. Four of the eight wires constitute two pairs of wires respectively used to send and receive data. Four of the wires are not used. One way to transmit a remote power feed current is to use the four wires that are not otherwise used. Another way consists of connecting the two terminals of a power supply generator in the remote power feed device to respective center-taps of a transformer winding connected to the data receive pair and a winding of another transformer connected to the data send pair; this is referred to as a phantom circuit. At the terminal end, the power supply voltage is provided at respective center-taps of a transformer winding connected to the data receive pair and a winding of another transformer connected to the data send pair.

The jack to which a terminal is connected is generally used in the following manner:

Four of the eight wires are separated into two pairs for respectively sending and receiving data. The terminal includes a transformer having a winding connected to the receive pair and a transformer having a winding connected to the send pair and each of these windings has a center-tap which can be connected to a reference potential via a low resistance.

Four other wires, which are not used, are connected to ground, often via a combination of resistors and capacitors, to eliminate any crosstalk currents induced by the data signals circulating in the first four wires, and to reduce undesirable electromagnetic emissions.

If a relatively high power supply voltage, for example 48 volts, is applied to this combination of resistors and capacitors, or to the resistors connected to the center-taps of the transformers, the current flowing in the resistors can destroy them. Terminals designed to receive a remote power feed are not subject to this risk.

However, a conventional terminal that is not designed to receive a remote power feed or to withstand the remote power feed voltage (for example a personal computer, a printer, etc) could be connected to the jack at the end of the connection. There is then a risk of damaging the electrical circuits of the terminal.

SUMMARY OF THE INVENTION

Producing remote power feed devices incorporating a device for automatically recognizing if a terminal is adapted to receive a remote power feed before applying the remote power feed has been envisaged. However, this device is insufficient for protecting conventional terminals in some cases. In particular, some Ethernet networks re-use the existing wiring of an integrated services digital network, and it may happen that several jacks are connected in parallel. In this case, plugging a terminal adapted to receive a remote power feed into one of these jacks causes the remote power feed voltage to be applied to the other jacks in parallel with it. There is therefore the risk of a user plugging a conventional terminal into one of these jacks and damaging the terminal.

The invention therefore aims to remedy this problem.

The invention provides a protection device for a terminal that can be connected to a jack connected to a local area network capable of providing a remote power feed to terminals, characterized in that it includes:

means for preventing the propagation of a direct current from said jack to the terminal, and means for signaling to a user the presence of a remote power feed voltage at the jack concerned.

BRIEF DESCRIPTION OF THE DRAWING

The invention will be better understood and other features of the invention will become apparent from the following description and the accompanying drawing which illustrates one embodiment of a protection device PD according to the invention intended to be used in an Ethernet network.

DETAILED DESCRIPTION OF THE INVENTION

The device includes:

a casing B;

an RJ45 male plug P1 attached to the casing B, incorporating eight contacts, and intended to be inserted into a wall-mounted female jack of an Ethernet network capable of providing a remote power feed to terminals; and an RJ45 female socket P2 attached to the casing B, incorporating eight contacts, and intended to receive an RJ45 male jack connected to any Ethernet terminal, whether adapted to receive a remote power feed or not.

Of the eight contacts of the male plug P1, four contacts that correspond to the conductors used to send data and the remote power feed are connected to four respective corresponding contacts of the female socket P2, by respective conductors L1, . . . , L4 interrupted by capacitors C1, . . . , C4 intended to block the DC remote power feed voltage (48 V). Four other contacts of the male plug P1, which correspond to conductors that are not used in a conventional Ethernet network, are connected to four respective corresponding contacts of the female socket P2 by respective conductors L5, . . . , L8 interrupted by capacitors C1', . . . , C4' intended to block the DC remote power feed voltage (48 V) which may be applied in addition to or instead of that applied to the four conductors previously mentioned.

The device PD further includes the following components to signal the presence of a remote power feed voltage:

a bridge comprising two resistors R1, R2 that bridge the two conductors L1 and L2 and are used to send data to the network and for a 0 V potential of the remote power feed;

a bridge comprising two resistors R3, R4 that bridge the two conductors L3 and L4 and are used to receive data from the network and for a −48 V potential of the remote power feed; and a light-emitting diode LED in series with a 24 V zener diode ZD, with the cathode of the zener diode ZD connected to the mid-point of the bridge R1, R2 and the cathode of the light-emitting diode LED connected to the mid-point of the bridge R3, R4.

Similar components with primed reference numbers are used to signal the presence of a remote power feed voltage on the conductors L4 to L8:

a bridge comprising two resistors R1', R2' bridging the pair of conductors L5 and L6;

a bridge comprising two resistors R3', R4' bridging the pair of conductors L7 and L8; and a zener diode ZD' and a light-emitting diode LED' connected in series between the mid-point of the bridge R1', R2' and the mid-point of the bridge R3', R4'.

If the protection device is used only in a network in which the four conductors that are not used to send data are also not used for the remote power feed, it is possible to omit the corresponding portion of the protection device. The four contacts of the mole plug P1 that correspond to the conductors that are not used to send data and the remote power feed are then connected directly to the respective four corresponding contacts of the female socket P2.

Because of the zener diode ZD, the light-emitting diode LED draws current only during the remote power feeding phase, and not during a terminal detection phase, which uses test signals at a voltage less than 24 V. The resistors R1 to R4 all have the same resistance to preserve the symmetry of the lines, and this resistance is chosen to enable the light-emitting diode LED to be turned on. The resistance of the combination R1+R2 and the resistance of the combination R3+R4 are very much greater than the line impedance. They therefore do not interfere with the data signals. Also, they consume a negligible portion of the energy supplied by the remote power feed device for a terminal.

To ensure the safety of conventional terminals in an Ethernet network capable of providing a remote power feed to terminals, it is necessary to plug this kind of device PD at least into all the jacks that are not connected individually to a concentrator or repeater port. If the wiring of a jack is not known, it is no trouble to plug the protection device into the jack as a precaution.

If a user wishes to plug a terminal adapted to receive a remote power feed into a jack into which a protection device is plugged, he must unplug the protection device and then plug in the male plug of the terminal instead of the device PD. After the terminal adapted to receive a remote power feed has been plugged in, the remote power feed device detects it and then applies the remote power feed. The remote power feed can be applied only to the conductors that are not used, only to the conductors for sending data, or to all the conductors. In the first case, the diode LED' of each protection device PD plugged into the jack or jacks connected in parallel lights and thereby advises users that it would be dangerous to unplug a protection device and plug in a conventional terminal instead. In the second case, the diode LED on each protection device PD plugged into the jack or one of the jacks connected in parallel lights. In the third case, the diode LED and the diode LED' of each protection device PD plugged into the jack or one of the jacks connected in parallel light.

In a different embodiment, the protection device does not have a male plug P1 and a female socket P2 attached directly to the casing, but is instead incorporated into an Ethernet cable with a respective RJ45 male plug at each end. That cable is then used instead of the conventional cable for each terminal that might be used in the network concerned and is not adapted to receive a remote power feed.

In another embodiment, the device is incorporated into a terminal such as a personal computer designed to withstand the remote power feed voltage and incorporating a jack for connecting a second terminal to the network, the first terminal having its own connection to the network and being used as a connect-through device or as a repeater. Because it is downstream of a protection device, the second terminal can be of any type.

What is claimed is:

1. A protection device for a terminal that can be connected to a jack connected to a local area network having data-carrying conductors capable of also providing a remote power feed to terminals, characterized in that it includes:

means (C1, . . . , C4; C1', . . . , C4') far preventing the propagation of a direct current from said jack to the terminal, and means (R1, . . . , R4, ZD, LED; R1' . . . , R4', ZD', LED') for signaling to a user the presence of a remote power feed voltage at the jack concerned.

2. The protection device according to claim 1, further characterized in that the means for signaling do not bypass the means for preventing.

3. The protection device according to claim 2, wherein the means for preventing are capacitors and the means for signaling are resistors.

4. A protection device for a terminal that can be connected to a jack connected to a local area network capable of providing a remote power feed to terminals, characterized in that it includes: means (C1 . . . , C4; C1', . . . , C4') for preventing the propagation of a direct current from said jack to the terminal, and means (R1, . . . , R4, ZD, LED; R1', . . . , R4', ZD', LED') for signaling to a user the presence of a remote power feed voltage at the jack concerned, said network including at least four conductors (L1, . . . , L4) of which one pair of conductors is used to send a first pole of a remote power feed voltage and to send data in a first direction and another pair of conductors is used to send the other pole of said remote power feed voltage and to send data in another direction, characterized in that the means for preventing the propagation of a direct current from said jack to the terminal include a capacitor (C1, . . . , C4) on each of said conductors, and in that the means for signaling to a user the presence of a remote power feed voltage at the jack concerned include: a first bridge comprising two resistors (R1, R2) bridging the first pair of conductors (L1 and L2), a second bridge comprising two resistors (R3, R4) bridging the second pair of conductors (L3 and L4), and signaling means (ZD, LED) connected to the mid-point of the first bridge (R1, R2) and to the mid-point of the second bridge (R3, R4).

5. The protection device according to claim 4, said network including at least four additional conductors (L5, . . . , L8), one pair of which is used to send a first pole of a second remote power feed voltage and another pair of which is used to send the other pole of said remote power feed voltage, characterized in that the means for preventing the propagation of a direct current from said jack to the terminal include a capacitor (C1', . . . , C4') on each of said four additional conductors, and in that the means for signaling to a user the presence of a remote power feed voltage at the jack concerned include: a third bridge comprising two resistors (R1', R2) bridging the first pair of additional conductors (L5 and L6), a fourth bridge comprising two resistors (R3', R4') bridging the second pair of additional conductors (L7 and L8), and signaling means (ZD', LED') connected to the mid-point of the third bridge (R1', R2') and to the mid-point of the fourth bridge (R3', R4').

* * * * *